United States Patent [19]

Sieren et al.

[11] 4,091,905
[45] May 30, 1978

[54] SUMP OIL TRANSFER SYSTEM

[75] Inventors: Gerald E. Sieren, Greendale; LLoyd F. Sippel, Burlington; George A. VandenHeuvel, Milwaukee, all of Wis.

[73] Assignee: Allis-Chalmers Corporation, Milwaukee, Wis.

[21] Appl. No.: 754,577

[22] Filed: Dec. 27, 1976

[51] Int. Cl.² ............................................. F16D 13/72
[52] U.S. Cl. ............................................... 192/113 B
[58] Field of Search ......................... 192/113 B, 70.12

[56] References Cited

U.S. PATENT DOCUMENTS

| | | | |
|---|---|---|---|
| 2,054,377 | 9/1936 | Havill et al. | 192/113 B X |
| 3,547,235 | 12/1970 | Weinrich | 192/113 B X |
| 3,659,668 | 5/1972 | Ross et al. | 192/113 B |
| 3,661,238 | 5/1972 | Davies | 192/70.12 X |
| 3,841,455 | 10/1974 | Eastwood | 192/113 B |
| 3,862,676 | 1/1975 | Schall | 192/113 X |

Primary Examiner—Benjamin W. Wyche
Attorney, Agent, or Firm—Arthur L. Nelson

[57] ABSTRACT

A sump oil transfer system which harnesses the kinetic energy of the oil slung from the clutch discs of a wet clutch to induce flow from one sump to another sump in a tractor transmission.

10 Claims, 5 Drawing Figures

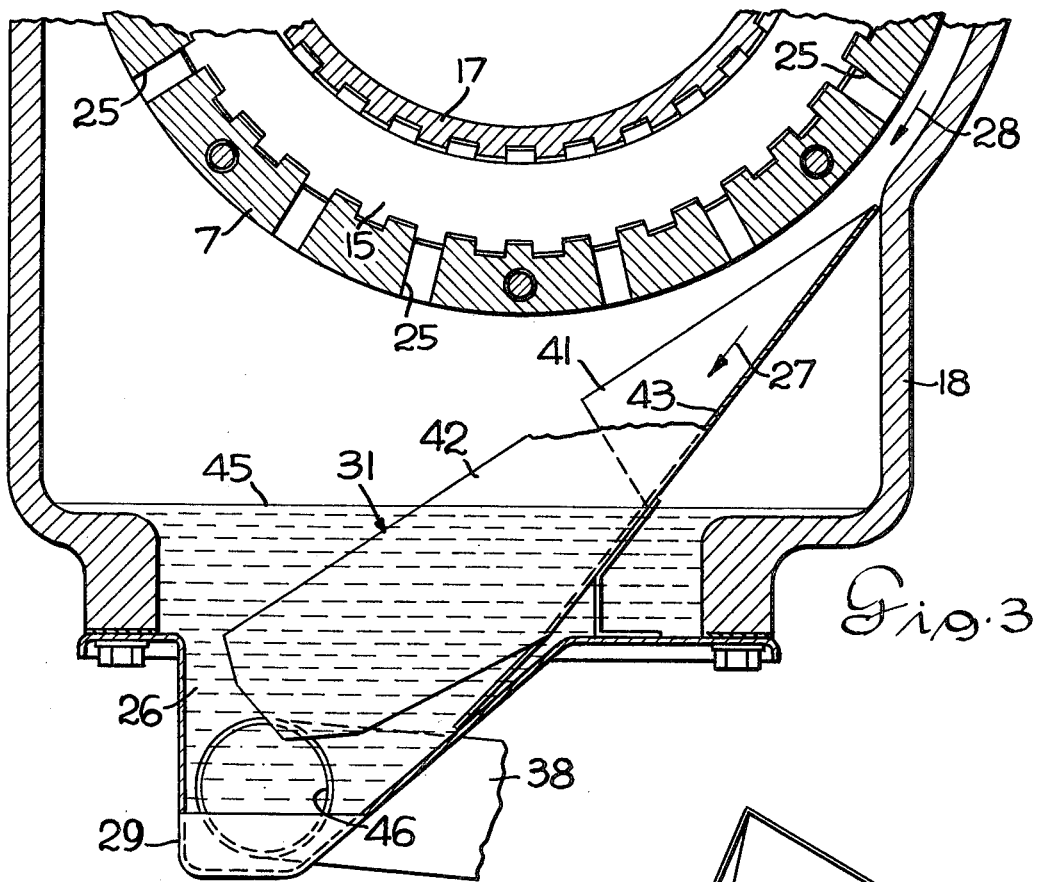
Fig. 3
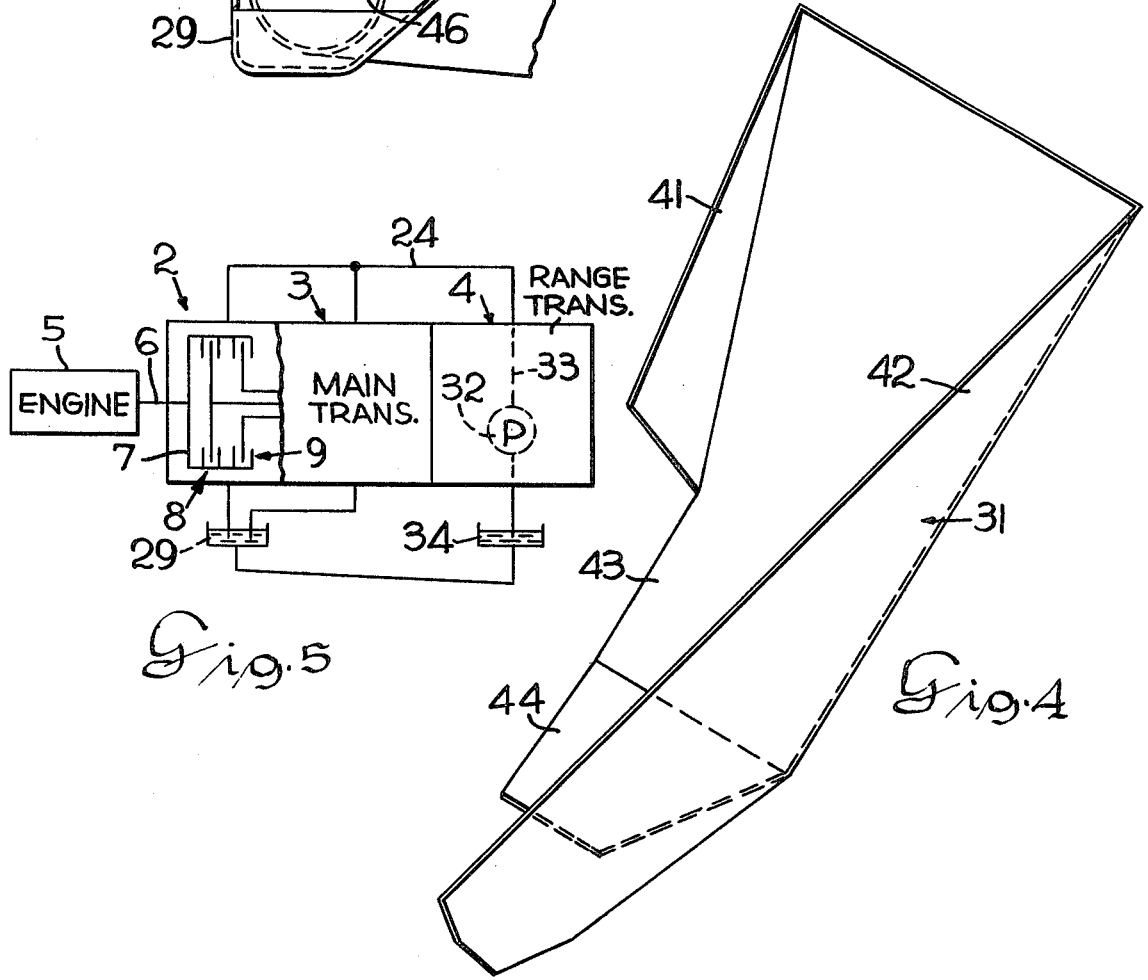
Fig. 5
Fig. 4

SUMP OIL TRANSFER SYSTEM

This invention relates to a vehicle transmission and more particularly to a sump oil transfer system which utilizes the kinetic energy of oil thrown off clutch discs in a rotating wet clutch assembly to induce flow from a sump in the vehicle transmission to a hydraulic fluid reservoir supplying fluid to a pump for pumping fluid to the wet clutch.

The modern tractor often has more than one sump in the power train. A sump is usually used in each transmission and more than one transmission may be used in the power train. Some tractors have a power shift transmission to give the operator the option of shifting "on the go" which directs drive into the main transmission. The main transmission is usually a manual shifting transmission which can be shifted to one of a plurality of speeds while the vehicle is standing still. To further increase the number of speed ratios of the power train, a range transmission may be used. The range transmission also may be a mechanically shiftable transmission of two or three speeds which multiply the speed ratios from the main transmission. Each of these transmissions usually has a sump for drainage of hydraulic fluid which is continuously supplied to the moving components in the transmissions. The pump draws from a reservoir which must have an ample reservoir of hydraulic fluid to assure that the pump does not draw a vacuum resulting in failure of the components in the transmission which must be lubricated at all times. The power shift transmission of the power train often employs wet clutches which can be shifted "on the go" and hydraulic fluid is supplied to the clutches whether they are engaged or disengaged. The fluid is returned to a sump in the transmission. Normally, the hydraulic fluid returns to a sump in each of the various transmissions of the power train. The level of the fluid is critical in the sump of the power shift transmission to avoid foaming of fluid and prevent power loss due to the clutches running in hydraulic fluid and the reservoir which supplies hydraulic fluid to the pump to assure an adequate supply of fluid. Accordingly, when the vehicle is traveling on uneven terrain, the fluid level in the reservoir supplying the pump may become dangerously low and accordingly this invention provides a means of inducing fluid flow back to the reservoir which supplies the hydraulic pump. This invention harnesses the kinetic energy of hydraulic fluid which is thrown off the discs and the clutch carrier to increase the relative surface pressure on the fluid in the sump of the power shift transmission. Within the conduit means connecting the sump in the power shift transmission to the reservoir in the range transmission which supplies the hydraulic fluid to the pump, a flow of oil is induced toward the reservoir supplying the pump. The pump creates a partial reduction in pressure at this point in the system, and accordingly the fluid flows into this reservoir and assures an adequate fluid level for continuous lubrication of the transmission and fluid supply to the wet clutches.

It is an object of this invention to provide a fluid transfer system inducing flow of oil in a tractor transmission to a reservoir supplying the oil to the lubrication pump.

It is another object of this invention to provide a sump transfer system by using the kinetic energy of the oil thrown off the clutch discs in a vehicle transmission to induce oil flow to the reservoir for the lubrication pump to assure adequate supply of oil at all times.

It is a further object of this invention to provide a sump pump in a power shift transmission having a wet clutch by harnessing the kinetic energy of the hydraulic fluid thrown off the clutch discs to induce fluid flow back to the main reservoir for the hydraulic pump.

The objects of this invention are accomplished in a power shift transmission having a wet clutch wherein the kinetic energy of hydraulic fluid flying off the clutch discs is harnessed to induce fluid flow from the sump in the power shift transmission to the reservoir in the range transmission in which the pump is located. The induced flow from the kinetic energy of the fluid from the power shift transmission causes the flow of the fluid to the reservoir for the pump even when the front end of the tractor is low which under ordinary circumstances may cause a shortage of fluid supply for the pump and a lack of lubrication in the hydraulic system and failure of the transmission.

Referring to the drawings, the preferred embodiment of this invention is illustrated in which:

FIG. 3 is a cross-section view taken on line III—III of FIG. 1;

FIG. 4 is a three-dimensional view of a deflector plate for directing the movement of oil thrown off the clutch discs; and FIG. 5 is a schematic diagram of the sump oil transfer system.

Figure 1:
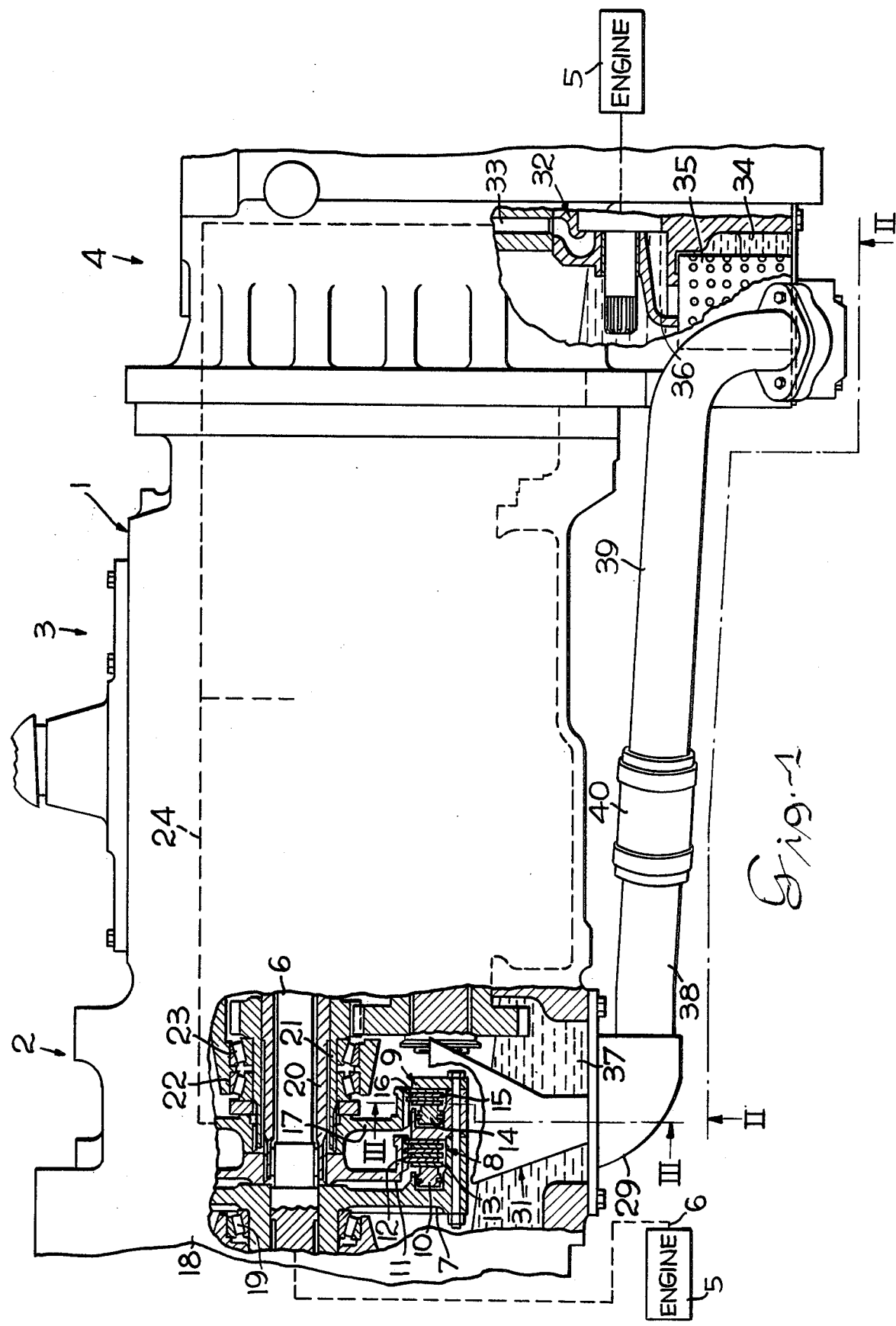
FIG. 1 illustrates a partially sectioned side elevation view of the power train of a tractor.

Referring to FIG. 1, the power train 1 includes the power shift section 2, the main transmission 3, and the range transmission section 4. The engine 5 drives into the power shift transmission. The engine drives through the drive shaft 6 which drives the clutch carrier 7. The clutch carrier 7 carries the clutches 8 and 9. The hydraulic actuator 10 operates the clutch 8 which includes the clutch hub 11 carrying the clutch discs 12 while the carrier carries the clutch discs 13 which are engaged by the hydraulic actuator 10 when the clutch is operated. The clutch 9 includes the hydraulic actuator 14, the clutch discs 15, and the clutch discs 16. The clutch discs 16 are carried on the clutch hub 17 while the clutch discs 15 are carried on the clutch carrier 7. The clutch 9 is actuated by the hydraulic actuator 14.

The transmission housing 18 carries bearings 22 and 23 rotatably supporting the shaft 21. The bearing 19 rotatably supports the clutch carrier 7 while the clutch hubs 11 and 17 are carried on the quill shafts 20 and 21, respectively. The quill shaft 20 is rotatably supported in quill shaft 21. Hydraulic fluid is supplied internally of the power shift transmission between the drive shaft 6 and the quill shaft 20 designated by the conduit means 24 which feeds into the clutch hubs 11 and 17 of the power shift transmission. A continuous flow of hydraulic fluid lubricates the clutch discs of both the clutches 8 and 9 to provide wet clutches in the transmission. This hydraulic fluid is released from the clutch discs through openings 25 as shown in FIG. 3 which are angularly spaced around the clutch carrier 7 to permit the oil to be thrown from the clutch carrier.

The oil is thrown tangentially from the clutch carrier 7 and oil thrown from the carrier in the position shown in FIG. 3 is thrown into the cavity 26 in the direction of the arrows 27 and 28. The cavity 26 is formed by the sump 29 on the bottom of the transmission housing 18. The deflector 31 deflects the fluid into the cavity 26.

The lubrication pump 32 is driven by the engine 5 and pressurizes fluid in the passage 33. Fluid is drawn from the reservoir chamber 34 through the filter 35 into the suction side of the pump through the inlet passage 36. The pump pressurizes fluid in the passage 36 which is in connection with the conduit means 24 which supplies components of the transmission to provide continuous lubrication of the transmission including the range shift transmission, main transmission, and the power shift transmission. The hydraulic fluid passing through the conduit means 24 is supplied internally in the power shift transmission to provide a wet clutch for operation of the power shift transmission.

Figure 2:
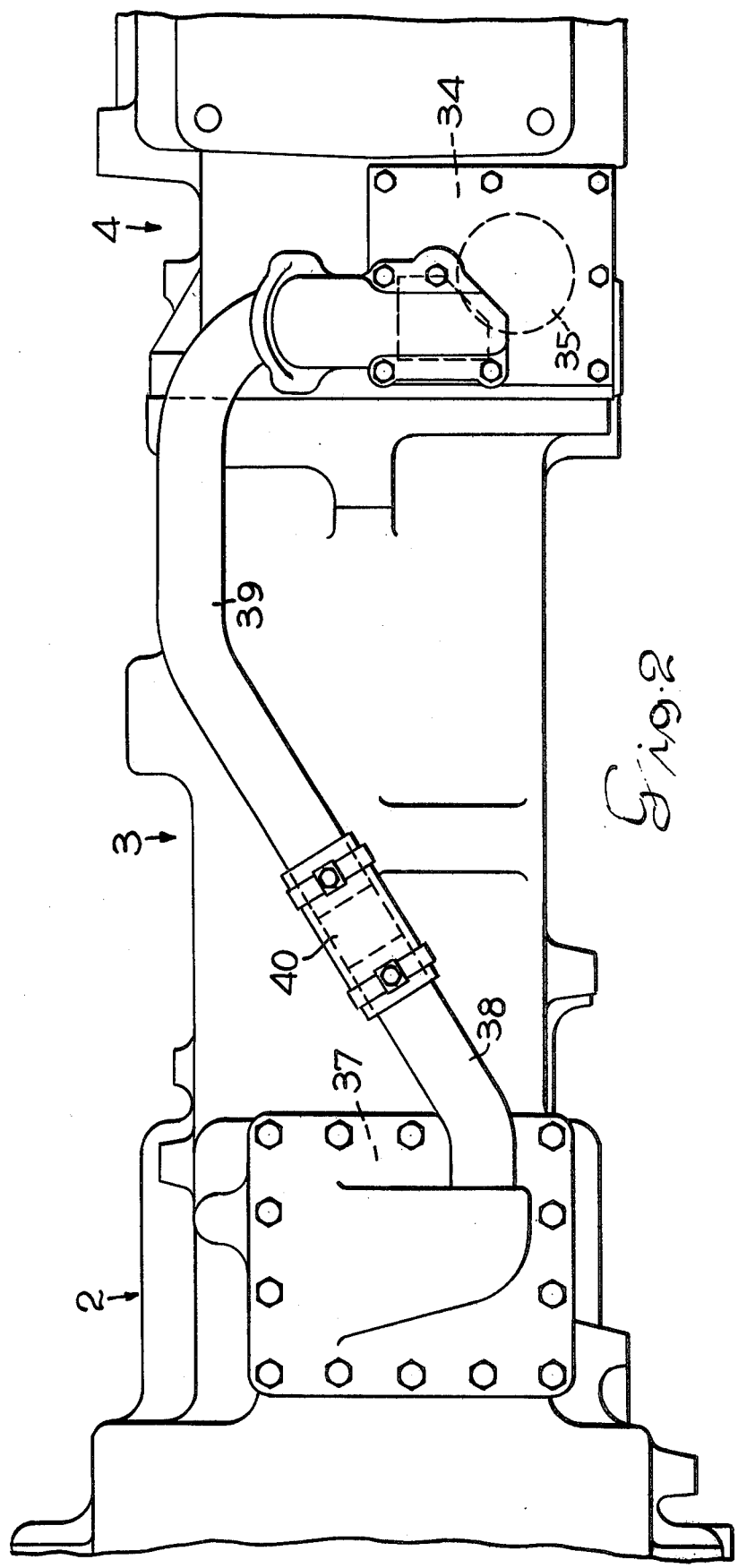
FIG. 2 illustrates a bottom view of the power train of a tractor viewed on line II—II of FIG. 1.

FIG. 1 is drawn to illustrate a situation where the vehicle is sloped downhill and the fluid level is inclined in the sump chamber 37 as well as in the reservoir chamber 34. The fluid normally would not flow back into the reservoir chamber 34 when the vehicle is in this position. The connecting pipes 38, 39 and coupling 40 provide a fluid connection between the sump chamber 37 and reservoir chamber 34. This provides communication between these two chambers and flow to the reservoir chamber 34 to maintain an adequate level during normal operations. FIG. 2 illustrates the underside of the vehicle in which the pipe 38, coupling 40 and pipe 39 connect the two chambers 37 and 34. The operation of this system will be described subsequently.

The inducement of flow from the sump chamber 37 is due to the kinetic energy in the oil thrown from the clutch carrier into the deflector 31. The deflector 31 includes flanges 41 and 42 which channel the oil into the center portion of the deflector. The surfaces 43 and 44 also direct the fluid toward the cavity 26. The fluid on the surface 45 of the cavity 26 is increased slightly and the tendency is to flow through the opening 46 in the pipe 38 and flow into the reservoir chamber 34. While the pressure in the opening 46 of pipe 38 is increased slightly, the pressure in the reservoir 34 is decreased slightly due to the suction in the inlet chamber 36 of hydraulic fluid pump 32. With the differential in pressure in the two chambers, the flow is directed into the reservoir 34 to maintain an adequate oil level for the intake side of the pump 32.

The operation of this device will be described in the following paragraphs.

The engine 5 drives the input shaft 6 which rotates the clutch carrier 7 when the vehicle is in operation. The pump 32 is also engine-driven and supplies hydraulic fluid to the moving components in the transmissions. A pump 32 supplies fluid to the power shift transmission 2 whereby the fluid is supplied from the radial center of the clutch carrier 7 and the fluid is allowed to pass over the clutch discs in clutches 8 and 9. As the clutch carrier 7 is rotated, the centrifugal force of the fluid is thrown out of the clutch through the openings 25 and sprayed radially against the internal portion of the housing 18. As the oil is thrown in the direction of the arrows 27 and 28, it is collected in the deflector 31 and directed toward the opening 46 of pipe 38. The kinetic energy in the oil thrown from the clutch carrier tends to depress the oil level in the cavity 26 of the sump 29. This creates a flow through the pipe 38, coupling 40 and pipe 39 to the reservoir chamber 34. Since the oil pump 32 is rotating when the engine is operating, the reservoir 34 is at a slightly reduced pressure because of the fluid being drawn into the pump. This in turn assists in creating the flow through the pipe 38, coupling 40 and pipe 39 into the reservoir chamber 34. When the vehicle is facing downhill slightly as indicated in FIG. 1, hydraulic fluid is caused to flow from the sump chamber 37 to the reservoir chamber 34 assuring adequate quantity of hydraulic fluid for the pump 32. The circulation of hydraulic fluid in the system is generally illustrated in FIG. 5.

The embodiments of the invention in which an exclusive property or privilege is claimed are defined as follows:

1. A hydraulic fluid transfer system in a vehicle transmission comprising, a transmission housing, a clutch carrier rotatably mounted in said transmission housing, a wet clutch including a hydraulic actuator and clutch discs mounted on said clutch carrier, hydraulic passage means continuously supplying hydraulic fluid to said wet clutch for wetting the clutch surfaces of said clutch discs, a sump formed in said transmission housing for receiving hydraulic fluid from said wet clutch, hydraulic pumping means continuously pressurizing hydraulic fluid and supplying hydraulic fluid to said hydraulic passage means, a fluid reservoir containing a fluid body for supplying hydraulic fluid to said hydraulic pumping means, a hydraulic conduit means connecting said sump to said reservoir, said sump and said transmission housing defining a cavity axially aligned with said wet clutch, and said sump containing a deflector having converging walls directing flow of hydraulic fluid thrown off of said wet clutch to an outlet formed by said sump means aligned with said deflector for inducing fluid flow from said sump through said conduit means to said reservoir, a hydraulic conduit means outlet immersed in the fluid body of said fluid reservoir, a hydraulic pumping means inlet including a filter centrally immersed in the fluid body of said reservoir reducing the fluid pressure in said reservoir and inducing fluid flow from said sump through said conduit means to said reservoir to maintain a fluid supply in said reservoir.

2. A hydraulic fluid transfer system in a vehicle transmission as set forth in claim 1 including a deflector in said transmission housing directing fluid thrown from said clutch discs and carrier into said cavity of said sump.

3. A hydraulic fluid transfer system in a vehicle transmission as set forth in claim 1 including openings angularly spaced in the periphery of said clutch carrier permitting hydraulic fluid from the clutch carrier to be thrown from said carrier.

4. A hydraulic fluid transfer system in a vehicle transmission as set forth in claim 1 including means locating said cavity of said sump tangentially from the peripheral surface of said clutch carrier.

5. A hydraulic fluid transfer system in a vehicle transmission as set forth in claim 1 wherein said transmission includes a power shift section, a range section, means locating said sump in said power shift section, means locating said reservoir in said range section.

6. A hydraulic fluid transfer system in a vehicle transmission as set forth in claim 1 wherein said conduit means includes a pipe connected on the underside of said transmission housing connecting said sump to said reservoir.

7. A hydraulic fluid transfer system in a vehicle transmission as set forth in claim 1 including means defining an outlet in said cavity of said sump, means positioning a deflector on the side of said housing directing the flow of hydraulic fluid thrown from said clutch carrier toward the outlet in said cavity.

8. A hydraulic fluid transfer system in a vehicle transmission as set forth in claim 1 including means defining an opening forming the outlet from said conduit means at the bottom of said reservoir, means defining an opening forming the inlet to said pump at the bottom of said reservoir to reduce the pressure in said reservoir to induce flow into said reservoir.

9. A hydraulic fluid transfer system in a vehicle transmission as set forth in claim 1 wherein said conduit means defines a return line normally permitting flow from said sump to said reservoir when said vehicle is in a level position.

10. A hydraulic transfer system in a vehicle transmission as set forth in claim 1 wherein said conduit means defines rounded corners and large cross-sectional area for laminar flow.

* * * * *